United States Patent [19]

Knopka

[11] 4,059,546
[45] Nov. 22, 1977

[54] TEXTILE FIBER BLEND COMPRISING CELLULOSIC FIBERS AND ETHYLENE 2,6-NAPHTHALENE DICARBOXYLATE-HALOGENATED COMONOMERS COPOLYESTER FIBERS

[75] Inventor: William N. Knopka, Wilmington, Del.

[73] Assignee: Avtex Fibers Inc., Valley Forge, Pa.

[21] Appl. No.: 385,572

[22] Filed: Aug. 3, 1973

Related U.S. Application Data

[63] Continuation-in-part of Ser. No. 328,043, Jan. 30, 1973, Pat. No. 3,874,155, and Ser. No. 328,044, Jan. 30, 1973, abandoned, and Ser. No. 328,045, Jan. 30, 1973.

[51] Int. Cl.$^2$ .............................................. C08L 1/12
[52] U.S. Cl. ...................................... 260/16; 8/115.7; 260/9; 260/75 H; 260/75 S; 260/47 R; 260/47 C; 260/49; 260/860
[58] Field of Search .................. 260/860, 75 H, 75 S, 260/47 R, 47 C, 49, 16, 9

[56] References Cited

U.S. PATENT DOCUMENTS

| | | | |
|---|---|---|---|
| 3,110,547 | 11/1963 | Emmert | 260/75 H |
| 3,265,762 | 8/1966 | Quisenberry | 260/860 |
| 3,321,330 | 5/1967 | Mohney | 428/277 |
| 3,455,713 | 7/1969 | Godfrey | 106/165 |
| 3,558,557 | 1/1971 | Hrach | 260/47 |
| 3,763,644 | 10/1973 | Jackson et al. | 260/75 |
| 3,794,617 | 2/1974 | Mains et al. | 260/47 |
| 3,824,213 | 1/1974 | Stackman | 260/47 |
| 3,833,685 | 9/1974 | Wambach | 260/860 |
| 3,839,140 | 10/1974 | Tyler et al. | 260/75 H |
| 3,874,155 | 4/1975 | Knopka | 57/140 BY |
| 3,874,157 | 4/1975 | Knopka | 260/860 |
| 3,883,611 | 5/1975 | Nelson | 260/860 |
| 3,909,482 | 9/1975 | Najour | 260/75 |
| 3,937,756 | 10/1976 | Klein | 260/75 |

OTHER PUBLICATIONS

Chem. Absts., vol. 77 (1972) 153,086x, "Comparative — Antimony Oxide — Methods", Bower et al.

*Primary Examiner*—Edward M. Woodberry
*Attorney, Agent, or Firm*—Arthur R. Eglington

[57] ABSTRACT

A flame-retardant filament-forming copolyester of at least 75 mol % of ethylene-2,6-naphthalene dicarboxylate units and at least 3 mol % up to 25 mol % of randomly copolymerized ester units having bromine or chlorine chemically united with either the diacid residue or both the diacid residue and the diol residue of said ester units. In addition, fibers of the above flame-retardant copolyester resin and flame-retardant cellulosic fibers are blended together to provide flame-retardant yarns and fabrics of excellent physical properties.

6 Claims, No Drawings

TEXTILE FIBER BLEND COMPRISING CELLULOSIC FIBERS AND ETHYLENE 2,6-NAPHTHALENE DICARBOXYLATE-HALOGENATED COMONOMERS COPOLYESTER FIBERS

This application is a continuation-in-part of applications Nos. 328,043, now U.S. Pat. No. 3,874,144; 328,044, now abandoned; and copending 323,045, all filed Jan. 30, 1973.

It is known that polyester resins have a high carbon content and are quite flammable. They can be rendered flame-retardant by incorporating inorganic and organic materials therein, especially those containing bromine, chlorine, phosphorous, antimony, zinc and alumina. The main drawback of these systems is the adverse effects they have on fibers produced therefrom, since appreciable quantities of flame-retardant agents are required to promote the required level for flame-retardance. As a result, these materials can render the fiber brittle or, in other ways, affect the usually outstanding physical properties of the polyester. Another disadvantage to the additive approach is the fact that such additives can be easily leached out or removed during normal laundering and dry cleaning, causing an adverse effect on the flame-retardancy of the fabric.

An alternate method to improve the flame-retardancy of a polyester resin is the incorporation of a comonomer which contains one or more of the elements that are known to impart flameretardancy, The major disadvantage of this approach is that the molar concentration of the comonome, which is required to achieve the desired level of flame-retardance, is generally so high that the resultant resin manifests physical properties not usually associated with polyester. For example, a large proportion of comonomer would lower the melting point and, as a result, limit the utility of the polyester. Likewise, certain comonomers lower the crystallinity of the polymer, producing amorphous polymers which are incapable of producing commercially suitable textile fibers. If a flame-retardant copolyester could be produced with good physical and thermal properties, it would receive widespread acceptance for the manufacture of shaped articles.

The need for a polyester fiber which has good physical properties and high flame-retardancy is most critical for yarn and fabric blends of polyester fibers and cellulosic fibers. Polyester fibers are thermoplastic and when exposed to a flame, burn and melt away from the flame, thus extinguishing themselves. If polyester fibers are blended with flammable cellulosic fibers and exposed to a flame, the polyester is more likely to continue burning even when melting since the burning cellulose fiber continuously ignites it. If polyester fibers are blended with flame-retardant cellulosic fibers and the blend ignited, the flame-retardant cellulosic fibers burn only in the area of flame contact. However, the flame-retardant cellulosic fiber acts as a scaffold or support and prevents the polyester fiber from dripping away from the flame and the polyester continues to burn.

It is a primary object of this invention to provide a flame-retardant polyester resin suitable for the formation of fibers which will meet more stringent flame-retardant test requirements while maintaining good fiber physical properties.

It is another object of this invention to provide a flame-retardant fiber blend of a flame-retardant polyester fiber and a flame-retardant cellulose fiber which fiber blend has good physical properties.

It is still another object of this invention to provide fibrics having good permanent flame-retardancy and good physical properties which fabrics are prepared from polyester fibers and cellulosic fibers.

These and other objects are accomplished in accordance with this invention which comprises a linear, filament-forming random copolyester resin of at least 75 mol % of the ethylene-2,6-naphthalene dicarboxylate units and at least 3 mol % up to 25 mol % of a copolymerized ester unit having bromine or chlorine chemically united with either the diacid residue of said ester unit or both the diacid residue and the diol residue of said ester unit in an amount sufficient to provide at least 3.5% of the halogen, based on the weight of the copolyester resin.

The ethylene-2,6-naphthalene dicarboxylate unit of this invention has the following structural formula:

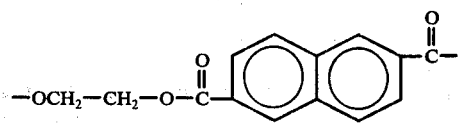

The halogenated ester unit for this invention has the following general formula:

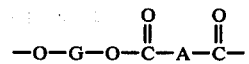

where G is the residue of a saturated diol or functional equivalent thereof, A is the residue of a saturated dicarboxylic acid or functional equivalent thereof and either A or both A and G are substituted with one or more halogen atoms including either bromine, chlorine or both. The functional equivalents of the diol include, for example, epoxides or lower acid esters, e.g., acetic acid esters, and the functional equivalents of the dicarboxylic acid include, for example, carbonyl halides, anhydrides, salts and esters of lower alcohols. These functional equivalents for diols and dicarboxylic acids and their reactivity in forming ester units as generally described above, are well-known and need not be described in further detail herein.

At least one of the radicals G and A are multivalent organic radicals depending principally on the number of halogen atoms attached thereto. These radicals are preferably hydrocarbon and more preferably aromatic hydrocarbon radicals but generally include aliphatic, substituted aliphatic, cycloaliphatic including heterocyclic radicals, aromatic and substituted aromatic radicals. These radicals may have various atoms, other than carbon, as an integral link in the radical chain or as substituents including for example, chalcogens, nitrogen and phosphorous. In addition, various substituent and linking groups may be present in the organic radical including, for example, sulfonic acid groups, sulfinic acid groups, phosphonic acid groups, phosphinic acid groups, salts of these acid groups, imide groups, amide groups, amine groups and the like.

In one of the preferred aspects of this invention, the diol portion of the halogenated ester unit is derived from a non-halogenated alkylene glycol of the general formula:

wherein n is an integer of 2 to 10, and the dicarboxylic acid portion contains a halogenated phenylene or halogenated naphthalene base radical. In another aspect of this invention, the diol portion of the halogenated ester unit is derived from a diol having the following general formula:

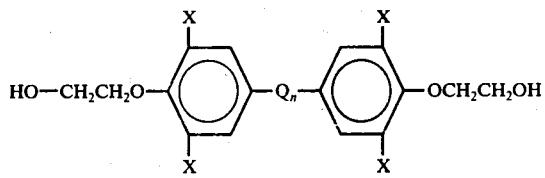

wherein X is bromine or chlorine, Q is -SO₂-, -O-, or

wherein R and R' are the same or different radicals including hydrogen, an alkyl radical having from 1 to 6 carbon atoms or an aromatic radical, and n is zero or one; and the dicarboxylic acid portion contains a halogenated phenylene or naphthalene base radical.

Examples of compounds which may be used to provide the diol portion of the halogenated ester units are set forth below:
ethylene glycol
trimethylene glycol
tetramethylene glycol
pentamethylene glycol
hexamethylene glycol
decamethylene glycol
2,2-diethyl-1,3-propandiol
2,2-dimethyl-1,3-propandiol
2,2,3,3-tetramethyl-1,4-butandiol
2-buten-1,4-diol
2-hexen-1,6-diol
3-octen-1,8-diol
2,2,5,5-tetramethyl-3-hexene-1,6-diol
diethylene glycol
triethylene glycol
tetraethylene glycol
dipropylene glycol
4,4'-dihydroxy-dibutyl ether
2,2-sulfonyl diethanol
4,4'-sulfonyl dibutanol
3,3'-[sulfonyl bis-(3-propyl sulfonyl)]dipropanol
4,4'-[1,4-butylene disulfonyl bis-(4-butyl sulfonyl)]-dibutanol
6,6'-(1,6-hexylene disulfonyl)dihexanol
sulfonyl bis-[3-(2,2-dimethyl)propanol]
hydroquinone
p-xylylene glycol
3,6-bis-(hydroxymethyl)durene
4,4'-bis-(hydroxymethyl)biphenyl
2,6-bis-(hydroxymethyl)naphthalene
1,5-bis(γ-hydroxypropyl) naphthalene
1,4-bis-(β-hydroxyethyl)benzene
2,2'-(p-phenylenedioxy)diethanol
3,3'-(p-phenylenedioxy)dipropanol    3,3'-(p-xylylenedioxyl)dipropanol
4,4'-(p-phenylenedisulfonyl)dibutanol
(1,5-naphthalene disulfonyl)dimethanol
1,4-cyclohexane dimethanol
1,4-cyclohexane-β,β'-diethanol
1,4-cyclohexane-δδ-dibutanol
1,4-cyclohexanedioxy-β,β'-diethanol
1,4-cyclohexane disulfonyl-β,β'-diethanol
β,β,β'β'-tetramethyl-2,4,8,10-tetraoxaspiro-(5.5)-undecane-3,9-diethanol
bis-(p-hydroxyphenyl)methane
1,1-bis-(p-hydroxyphenyl)ethane
2,2-bis-(p-hydroxyphenyl)propane
1,1-bis-(p-hydroxyphenyl)cyclohexane
bis-(p-hydroxyphenyl)phenylmethane
bis-(o-carboxyphenyl)-1,2-dioxyethane
bis-(p-hydroxyphenyl)sulfone
1,4-bis-(β-hydroxyethoxy)-2,5-ditertiary-butyl benzene The diol compounds may also be used in the form of functional equivalents of diols, as previously stated, and may be halogenated with bromine or chlorine. Where compounds having olefinic unsaturation are mentioned, such as 2-buten-1,4diol, they are necessarily halogenated to provide saturated compounds.

Some preferred examples of halogenated diols or functional equivalents include:
2,2-bis [4-(β-hydroxyethoxy)-3,5-dichlorophenyl] propane
2,2-bis [4-(β-hydroxyethoxy)-3,5-dichlorophenyl] butane
3,3-bis [4-(β-hydroxyethoxy)-3,5-dibromophenyl] pentane
5,5-bis [4(β-hydroxyethoxy)-3,5-dibromophenyl] nonane
bis [4-(β-hydroxyethoxy)-3,5-dichlorophenyl] methane
bis [4-(β-hydroxyethoxy)-3,5-dibromophenyl] methane
bis [4-(β-hydroxyethoxy)-3,5-dichlorophenyl] sulfone
bis [4-(β-hydroxyethoxy)-3,5-dibromophenyl] sulfone
bis [4-(β-hydroxyethoxy)-3,5-dichlorophenyl] ether
bis [4-(β-hydroxyethoxy)-3,5-dibromophenyl] ether
bis [4-(β-hydroxyethoxy)3,5-dibromophenyl]diphenyl methane
4,4' bis (β-hydroxyethoxy)-3,3',5,5' tetrabromobiphenyl
3,3',5,5'-tetrabromo bisphenol-S-diacetate Other examples of halogenated diols or their functional equivalents have the following general formulas:

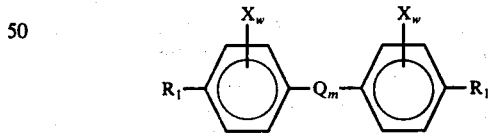

wherein X is bromine or chlorine and w is 1-4; Q is a divalent saturated aliphatic hydrocarbon radical having from 1 to 6 carbon atoms, a divalent saturated cycloaliphatic hydrocarbon radical of 5 to 7 carbon atoms, —O—, —CO—, —S—, —S—S— or —SO₂—; m is zero or one and R₁ is

wherein R₂ is an alkyl or aromatic group or —O(CH₂CH₂O)$_b$H wherein b is 1, 2, 3 or 4.

wherein $R_3$ is —OCH$_2$CH$_2$OH or

wherein $R_4$ is a lower alkyl radical, $c$ is 1 or 2, preferably 2, X is bromine or chlorine and $d$ is 1–4, preferably 2 or 4

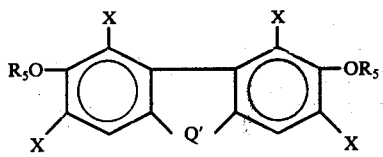

wherein X is bromine or chlorine and $R_5$ is —H, (CH$_2$CH$_2$O)$_e$H wherein $e$ is 1 or 2 or

wherein $R_6$ is a lower alkyl radical and Q' is —SO$_2$— or —O—,

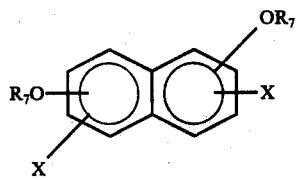

wherein $R_7$ is —H,(CH$_2$CH$_2$O)$_f$H wherein $f$ is 1 or 2 or

wherein $R_8$ is a lower alkyl radical, and X is bromine or chlorine.

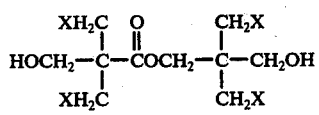

wherein X is bromine or chlorine.

The use of trifunctional or higher polyfunctional hydroxy compounds such as glycerine, pentaerythritol andd trimethylol propane as ester components must be avoided or limited to very small amounts to prevent or minimize cross-linking of the polymer chains.

Examples of compounds which may be used to provide the dicarboxylic acid portion of the halogenated ester units are set forth below:
oxalic acid
adipic acid
pimelic acid
suberic acid
azelaic acid
sebacic acid
succinic acid
malonic acid
brassylic acid
glutaric acid
2,3-dimethyl glutaric acid
methyl succinic acid
methyl malonic acid
p-cyclohexane dicarboxylic acid
p-1,4-andomethylene cyclohexane dicarboxylic acid
terephthalic acid
isophthalic acid
orthophthalic acid
2-methyl terephthalic acid
4,4'-methylene dibenzoic acid
4,4'-benzophenone dicarboxylic acid
4,4'-diphenic acid
4,4'-dicarboxy diphenyl ether
1,2-di(p-carboxyphenyl)-ethane
1,2-di(p-carboxyphenoxy)-ethane
2,6-naphthalene dicarboxylic acid
2,7-naphthalene dicarboxylic acid
2,5-norcamphane dicarboxylic acid
2,7-spiro(4.4)nonane dicarboxylic acid
2,6-spiro(3.3)heptane dicarboxylic acid
2,4,8,10-tetraoxaspiro(5.5) undecane dicarboxylic acid
p,p'-sulfonyl dibenzoic acid
p-carboxycarbanilic acid
bis-(p-carboxyphenyl)phosphonic acid salt These dicarboxylic acid compounds are used as their functional equivalents, as previously mentioned, and are halogenated with bromine or chlorine to provide the halogenated portion of the ester unit. The dicarboxylic acids may be reacted directly with the diols to form the ester unit or low polymer thereof or the dicarboxylic acid may be used in the form of its lower dialkyl ester and reacted with the diol to provide the halogenated ester by means of an ester-interchange, as is well-known in this art.

Some examples of preferred halogenated dicarboxylic acids which are useful for this invention include:
2,5-dibromoterephthalic acid
2,5-dichloroterephthalic acid
2,2',6,6'-tetrachlorodiphenoxyethane-4,4'-dicarboxylic acid
3,5-dibromo isophthalic acid Examples of other halogenated dicarboxylic acids or their functional derivatives are represented by the following general formulas:

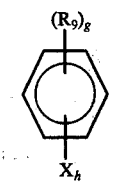

wherein $R_9$ is $$-\overset{O}{\underset{\|}{C}}-OR_{10}$$

wherein $R_{10}$ is —H, lower alkyl or aryl, $g$ is 1 or 2, preferably 2; X is bromine or chlorine and $h$ is 1–4, preferably 2 or 4.

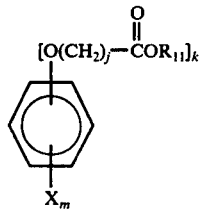

wherein $R_{11}$ is —H, lower alkyl or aryl, $j$ is 1–6, $k$ is 1 or 2, preferably 2; X is bromine or chlorine and $m$ is 1–4.

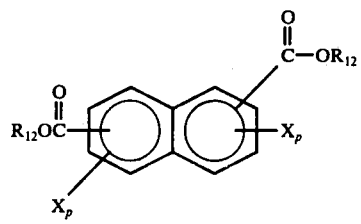

wherein $R_{12}$ is —H or lower alkyl, X is bromine or chlorine and $p$ is 1 or 2,

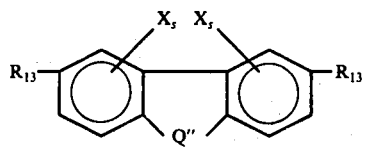

wherein $R_{13}$ is

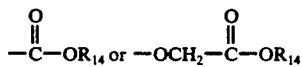

where $R_{14}$ is —H or lower alkyl, X is bromine or chlorine, $s$ is 1 or 2 and Q'' is —O— or —SO$_2$—.

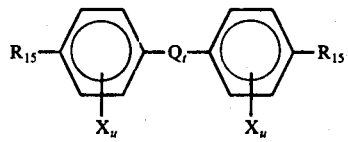

wherein $R_{15}$ is

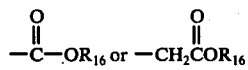

wherein $R_{16}$ is —H or lower alkyl, Q is a divalent saturated aliphatic hydrocarbon radical having from 1 to 6 carbon atoms, a divalent saturated cycloaliphatic hydrocarbon radical of 5 to 7 carbon atoms, —O—, —CO—, —S—, —S—S—, —SO$_2$— and —CH$_2$—SO$_2$—CH$_2$—, $t$ is zero or one X is bromine or chlorine and $u$ is 1–4.

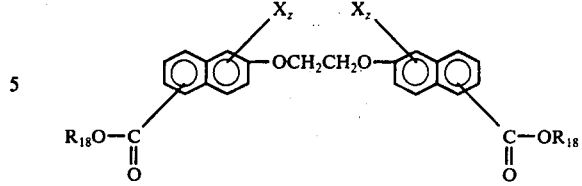

wherein $R_{18}$ is —H or lower alkyl, X is bromine or chlorine and $z$ is 1–6.

In addition to the diacid and diol compounds which are used to form the halogenated ester units, monofunctional halogenated organic acids and alcohols, some of which have already been structurally depicted, may be used as end groups for the copolyester chains. These monofunctional compounds are generally used in combination with difunctional halogenated comonomers in order to obtain the desired halogen content in the copolyester resin.

Still further, difunctional compounds which contain both a single carboxyl group and a single hydroxyl group may be employed as ester linking compounds. Examples of this type of compound are illustrated in the following general formulas:

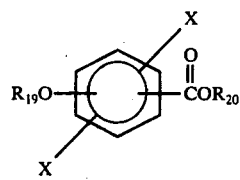

wherein $R_{19}$ is —H,

wherein $R_{21}$ is a lower alkyl radical, or —CH$_2$CH$_2$OH, $R_{20}$ is —H or a lower alkyl radical and X is —H, bromine or chlorine.

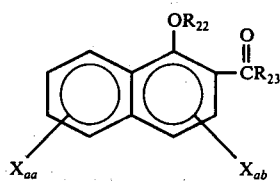

wherein $R_{22}$ is —H,(CH$_2$CH$_2$O)$_{ac}$ H wherein $ac$ is 1 or 2, $R_{23}$ is —H or lower alkyl, X is bromine or chlorine, $aa$ is 1–4 and $ab$ is 1 or 2.

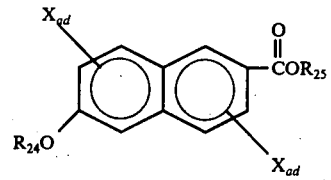

wherein $R_{24}$ is the same as $R_{22}$, $R_{25}$ is the same as $R_{23}$, X is bromine or chlorine and $ad$ is 1 or 2.

The halogenated ester unit of this invention is randomly situated in the copolyester molecule chain. For the purpose of this invention, the term "random" includes those copolyesters which have small blocks of halogenated ester units randomly positioned in the chain. Thus, up to about 5 halogenated ester units of the same or similar structure can be linked together and positioned in the high molecule chain.

Furthermore, halogenated ester units of this invention can have both diol and diacid portions which are either brominated or chlorinated. Thus, both a halogenated diol and halogenated diacid may be chemically joined to form an ester unit which is randomly positioned in the polymer chain. Likewise, ester units of a halogenated diol and non-halogenated diacid and ester units of a non-halogenated diol and a halogenated diacid may both be present in the same copolyester chain.

As previously stated, the halogenated copolyester of this invention contains bromine or chlorine chemically united therewith in an amount sufficient to provide at least 3.5% of the halogen, based on the weight of the copolyester. Preferably, there is at least 5% of the stated halogen present. The amount of halogen which can be present depends on the number of halogen atoms attached to the halogenated ester units and the number of ester units, up to 25 mol %, in the copolyester chain. The percent of halogen present will also relate to the molecular weight of the halogenated ester unit.

The copolyester resin can contain up to 10 mol % of other interpolymerized, non-halogenated, ester units as is well-known in this art to vary the properties of the resin as desired without deleteriously affecting the flame-retardant properties of the resin. It should be understood that, in any case, the amount of ethylene 2,6-naphthalene dicarboxylate units should not be less than 75 mol % of the copolyester. Other ester units, which may be interpolymerized constituents of the copolyester chain in an amount up to 10 mol % are well-known in the art and are usually derived from other diacids and diols such as previously described. Some specific examples of these non-halogenated diacids and diols include terephthalic acid, isophthalic acid, bibenzoic acid, sodium sulfoisophthalic acid, sodium sulfoalkoxyisophthalic acid, diphenyl sulphone dicarboxylic acid, malonic acid, glutaric acid and the like; alkylene glycols having from 3 to 12 carbon atoms, gem-dialkyl glycols, bis(hydroxymethyl)cyclohexane, diethylene glycol and the like.

The copolyester resins of this invention are conventionally prepared by reacting the major diacid and diol components with a halogenated diacid, diol or both to obtain a high molecular weight polycondensation product. The transesterification method is a preferred technique for obtaining the copolyesters. This employs the lower alkyl diesters of the diacids with one or more diols in an ester interchange reaction. The glycol diester or lower molecular weight polymer thereof is then polycondensed to a filament-forming copolyester resin. Transesterification and/or polycondensation catalysts along with elevated temperature and varied pressure conditions are employed, as is well-known in this art. In the direct method for preparing copolyester resins, the diacid and diol components are reacted directly in the first stage and thereafter the product is polycondensed to provide the high molecular weight resin. First and second stage catalysts along with elevated temperature and varied pressure are employed, as is well-known in the art.

As an alternative procedure, a functional halogenated diol or a halogenated dicarboxylic acid lower alkyl diester can be reacted (polycondensed) with a low molecular weight polymer or prepolymer of ethylene-2,6-naphthalene dicarboxylate to provide the filament-forming resin. This last type of reaction is not recommended, however, in the case of aromatic dicarboxylic acids having the halogen atom in the ortho position of the aromatic ring since the reactivity of such compounds is severely limited as in the case of 2,5-dibromoterephthalic acid.

The copolyester resins of this invention are those having an intrinsic viscosity of at least about 0.15 and preferably at least about 0.35 as determined in a 60 weight % phenol and 40 weight % tetrachloroethane solution at 30° C.

The copolyester resin described herein can have various additives incorporated therein to improve the resin properties. For example, heat, oxidation and ultra-violet light stabilizers, antistatic agents, plasticizers, dyes, pigments and the like can be employed.

Additionally, a metal compound from the group consisting of antimony oxides, e.g., antimony trioxide; antimony salts of $\alpha$-hydroxycarboxylic or $\alpha,\beta$-dicarboxylic acid (see Ger. Off. 2121186), zinc oxide, alumina and mixtures thereof can be mixed into the copolyester resin to provide additional improvement in flame-retardant properties. The metal compound is present in an amount such that the metal is present in an amount of from about 0.5 to about 5%, based on the weight of the resin.

While the resin of this invention can be formed into various shaped articles including filaments, bands, sheets and molded articles, it is especially useful when formed into textile fibers and yarns. These fibers are used, for example, to prepare flame-retardant clothing, carpets and draperies.

Fibers or filaments are usually formed by melt extrusion of the resin composition through a multihole spinneret in a conventional manner. The as-spun yarn is then conventionally oriented to produce textile yarn of the continuous filament or staple fiber type.

The most important embodiment of this invention comprises a mixture of fibers of the flame-retardant copolyester resin described herein and flame-retardant cellulosic fibers, especially those having permanent flame-retardant properties. Mixtures or blends of these flame-retardant copolyester fibers and flame-retardant cellulosic fibers provide textile fabrics having the highly desirable wear characteristics of polyester textiles with the highly desirable comfort characteristics of cellulosic material.

Flame-retardant cellulosic fibers preferably include cotton, rayon or cellulose acetate fibers which have been combined, impregnated or coated with flame-retardant chemicals which provide substantially permanent flame-retardant properties therefor without degrading the physical properties of the fiber. That is, the cellulosic fibers or fabrics produced therefrom should be capable of withstanding periodic washing or cleaning with conventional dry cleaning solvents without losing much of their flame-retardant properties. Many flame-retardant treatments for cellulosic fibers are known and several have been found to produce substantially permanent flame-retardancy. It is preferred, in the case of artifically prepared cellulosic fibers such as rayon and cellulose acetate, that the flame-retardant chemical be incorporated into the cellulosic spinning solution thereby providing cellulosic fibers having the flame-retardant "locked in" the cellulosic matrix. Examples of the preparation of these types of cellulosic fibers are found in U.S. Pat. No. 2,816,004, 3,266,918, 3,321,330, 3,455,713, 3,556,825, 3,645,936 and 3,704,144.

One preferred form of this invention involves the use of the flame-retardant regenerated cellulose filaments or fibers described in U.S. Pat. No. 3,455,713. These fibers have been found to have excellent physical properties and permanent flame-retardancy. In brief, they are regenerated cellulose filaments having dispersed therein a substantially water-insoluble, liquid phosphonitrilate polymer having the general formula:

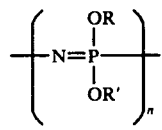

wherein R and R' are the same or different alkyl or alkenyl radicals having from one to six carbon atoms and $n$ is an integer of at least three.

These filaments are preferably prepared by incorporating a flame-retarding amount of the phosphonitrilate polymer in filament-forming viscose, and spinning and regenerating filaments.

In another aspect of the invention, the flame-retardant cellulosic fibers are cellulose acetate fibers prepared by incorporating flame-retardant amounts of compounds such as tris-(2,3-dibromopropyl) phosphate or similar compounds as disclosed in U.S. Pat. No. 3,321,330 into the acetate spinning dope and wet or dry spinning the fibers. Preferably, such compounds are used in amounts ranging from about 2 to about 15% based on the weight of the cellulose acetate.

In general, fiber blends of this invention will contain from about 10 to 90, preferably 20 to 80 weight percent copolyester fibers and 90 to 10, preferably 80 to 20 weight percent of cellulosic fibers.

The blended or combined flame-retardant copolyester and cellulosic fibers are used in various fiber and fabric constructions including, for example, spun staple yarns, mixed or tangled continuous filament yarns, novelty yarns, knit, woven and non-woven fabrics.

The flame-retardant copolyester fibers described herein can also be blended with or combined in a fabric with normally flame-retardant fibers including, for example, glass fibers, polyvinyl chloride fibers, asbestos fibers, metal fibers, modacrylic fibers such as those having the trademark DYNEL and VEREL, and aromatic ring polyamide fibers such as that having the trademark NOMEX. Fiber and fabric blends can, of course, comprise more than one of the other known flame-retardant fibers with the flame-retardant copolyester fibers of this invention.

It is realized that blends of copolyester fibers and cellulosic fibers have been treated, usually in the form of a fabric, with flame-retardant chemicals to provide flame-retardant material. However, this approach does not usually provide fabrics which will retain their flame-retardant properties after many washings or dry cleaning treatments. Furthermore, such aftertreatments tend to stiffen the fabrics to an undesirable extent.

The following examples are set forth demonstrating this invention.

EXAMPLE I 2,5-dibromoterephthalic acid was prepared in accordance with the procedure described in British Specification No. 946,259 except that the brominated terephthalic acid was not esterified but recrystallized from glacial acetic acid.

Filament-forming random copolymer resins containing varied amounts of bromine with or without antimony were prepared by reacting 2,5-dibromoterephthalic acid with bis(2-hydroxyethyl)-2,6-naphthalene dicarboxylate under conventional polycondensation conditions. Varying amounts of antimony trioxide were incorporated with the reactants to obtain the desired antimony content. In a similar manner, various filament-forming random copolymer resins of 2,5-dibromoterephthalic acid and bis(2-hydroxyethyl) terephthalate were prepared.

The copolyester resins were first evaluated for flame-retardancy by grinding the resin sufficiently for the resulting particulate to pass through a 10 mesh screen and pressed into plaques 1/32 × 5½ × 5½ inches. The plaques were prepared as follows: A chrome plated brass plate is placed in a Carver Press; a sheet of 6¼ × 6¼ inches Teflon coated aluminum foil is placed on the brass plate, followed by a 6 × 6 × 1/32 inches spacer with inside dimensions of 5½ × 5½ inches. A 6 gram sample of the polymer to be evaluated is spread evenly inside the spacer. Next, a 5½ × 5½ inches square of fiberglass fabric is placed on the resin powder. Another 6 grams of resin is spread on the top surface of the fiberglass, followed by another sheet of Teflon coated foil and a second chrome plated brass plate. The press platens (previously heated at 270° C.) are slowly closed to the point where they just begin to touch the top chrome plate. After 3 minutes, the platens are tightly closed and the pressure raised to 10,000–12,000 p.s.i.g. After 1 minute, the pressure was released and the laminate quenched in a cold bath. The resultant plaques were cut into ½inch × 5½ inches strips and evaluated in the Standard Method of Test for Flammability of Plastics using the Oxygen Index Method, ASTM-D-2863-70, commonly called the LOI test. The higher the LOI number, the better the flame-retardant property of the resin.

The results of the LOI test on various plaques of resins prepared as described above are set forth in the following table. The designation PET-DBT in the following table indicates a filament-forming copolyester of ethylene terephthalate units and ethylene-2,5-dibromoterephthalate units and the designation PEN-DBT indicates a filament-forming copolyester of ethylene 2,6-naphthalene dicarboxylate units and ethylene-2,5-dibromoterephthalate units as described for this invention.

Table I

| | Resin | Br.,%* | Sb.,%** | LOI Number |
|---|---|---|---|---|
| (1) | PET-DBT | 5.22 | — | 22.4 |
| (2) | PET-DBT | 9.81 | — | 26.7 |
| (3) | PEN-DBT | 4.69 | — | 30.5 |
| (4) | PET-DBT | 5.13 | 0.94 | 26.3 |
| (5) | PEN-DBT | 4.55 | 0.50 | 35.2 |
| (6) | PET-DBT | 9.41 | 1.00 | 30.0 |
| (7) | PEN-DBT | 9.88 | 0.60 | 44.0 |
| (8) | PET-DBT | 13.90 | 1.06 | 36.0 |

*Percent bromine (from brominated comonomer) based on the weight of the resin composition.
**Percent antimony (from antimony trioxide) based on the weight of the resin composition.

It can be seen from the results in the above table that the copolyester resins of this invention have much greater flame-retardant effectiveness than similar copolyesters of ethylene terephthalate and ethylene-2,5-dibromoterephthalate.

EXAMPLE II

Copolyesters of ethylene-2,6-naphthalene dicarboxylate units and ethylene-2,5-dibromoterephthalate units in various mol ratios with and without antimony were prepared using the following general procedure.

A reaction vessel, equipped with a nitrogen inlet, heating means and stirring means, was charged with 498.44 grams (2.0 mols) of dimethyl-2,6-naphthalene dicarboxylate, 260.4 grams (4.2 mols) of ethylene glycol and 0.1147 grams of manganous acetate (0.04 mol % based on the mols of the dicarboxylate). The mixture was slowly heated under a nitrogen atmosphere to 165° C. over 45 minutes, at which time the first drop of distillate was observed; after an additional 33.0 minutes, the reaction temperature had reached 193° C., at which time 50% of the theoretical methyl alcohol had been collected. Heating was continued at 193°–221° C. for 90 minutes, followed by a final period of 70 minutes at 221°–225° C. After cooling, the reaction equipment was dismantled, giving 611.4 grams of white prepolymer. This was used without further purification in the next step.

One hundred thirty-seven and three-tenths grams of the above prepolymer, 12.7 grams of 2,5-dibromoterephthalic acid, 0.039 gram of $Sb_2O_3$ and 0594 gram of triphenyl phosphite were charged into a reaction vessel. The mixture was heated to 225° C. in 40 minutes under a nitrogen atmosphere. The temperature was raised from 225° C. to 275° C. in 65 minutes while lowering the pressure to 0.6 mm. of mercury. After 90 minutes, the polycondensation was finished, giving the copolyester resin. The resulting resin was spun into a 10 filament yarn through a spinneret affixed to the reactor bottom and the yarn was uniformly oriented by drawing at a temperature of 149° C. and at a 4.025:1 draw ratio.

This oriented polyester yarn was then combined in a conventional manner with a permanent flame-retardant rayon to provide a 50/50 blended yarn. The rayon was prepared in accordance with United States Patent No. 3,455,713 and contained about 15% by weight of a water-insoluble, liquid polymer of di-n-propyl phosphonitrilate. The resulting yarn blend was knit on a Lawson knitting machine into a sleeve weighing 4.93 oz. per square yard. The blended fabric was evaluated in a vertical flammability test as defined by the United States Department of Commerce FF 3-71 (37 F.R. 146,424), "Standard for the Flammability of Childrens Sleepwear". The test results are shown in Table II.

Table II

Vertical Flammability Test (3 second bone dry)

5 samples, NAF[1], 2.11 inches CL[2]

[1]NAF = "no after flame", meaning material self-extinguishing when flame source was removed
[2]CL = "char length"

An analysis of the copolyester fiber produced in this example revealed the presence of 4.58% bromine, an intrinsic viscosity of 0.36, a free carboxyl content of 13 meq./kg., a glass transition temperature of 76° C., and a crystalline melting point of 246° C. These data clearly show that the copolyester resins of this invention, as shown in EXAMPLE I, would also pass the vertical flame test if they had been spun into fibers.

EXAMPLE III

In a manner similar to that described in EXAMPLE II, 29.2 grams of 2,5-dibromoterephthalate acid was added to 150 grams of prepolymer (previously prepared by reacting 2.1 moles of ethylene glycol with 1.0 mol of dimethyl terephthalate in the presence of calcium acetate; 0.92% methoxyl; 7.31% free ethylene glycol; 6 meq./kg. free carboxyl; 1.18% diethylene glycol content). The polycondensation was catalyzed by 0.12 grams of antimony trioxide.

The temperature was raised from 200° C. to 250° C. in 2 hours, while lowering the pressure to 0.6 mm. of mercury. After 210 minutes, the polycondensation was finished giving the copolyester resin. The resulting resin was spun into a 10 filament yarn through a spinneret affixed to the reactor bottom. The yarn was uniformly oriented by drawing at a temperature of 121° C. and at a 3.36:1 draw ratio. After drawing, it was combined in a conventional manner with the flame-retardant rayon described in EXAMPLE II to provide a 50/50 yarn blend. This yarn was knit on a Lawson knitter and weighed 6.95 oz. per square yard. The fabric blend was evaluated in the vertical flame test in the same manner as described in EXAMPLE II. The test results are shown in the following table.

Table III

| Burn | Vertical Flammability Test (3 second bone dry) | |
|---|---|---|
| (1) | 2.0 sec. AF[1] | 3.06" CL[2] |
| (2) | 2.0 sec. AF | 3.19" CL |
| (3) | 1.0 sec. AF | 3.06" CL |
| (4) | 11.0 sec. AF | 3.56" CL |
| (5) | 2.0 sec. AF | 3.31" CL |

[1]AF = after flame; material continued to burn for the period shown after the flame was removed
[2]CL = char length; original sleeve length was 10 inches An analysis of the polyester fiber of this example before blending revealed that it contained 9.49 weight % bromine, had an intrinsic viscosity of 0.49, a free carboxyl content of 13 meq./kg. and contained 0.4% of diethylene glycol. These data show that in spite of the increased quantity of bromine in the ethylene terephthalate copolymer, the copolyester containing ethylene 2,6-naphthalene dicarboxylate units is clearly superior. Copolyesters containing ethylene terephthalate units manifest longer periods of burning after the flame is removed causing 50% longer char lengths. The effect of the relatively small amount of bromine plus the synergistic influence of the 2,6-naphthalene dicarboxylate units on the flame-retardancy is quite unexpected.

EXAMPLE IV

To a stainless steel polymerization reactor equipped with stirring and heating means was added 33 pound of dimethyl terephthalate, 22 pounds of ethylene glycol and 22.1 grams of calcium acetate. After heating for 4 hours at 20°–225° C., the transesterification sequence had been completed. At this point, 4.5 pounds of 2,5-dibromoterephthalic acid and 15.7 grams of antimony trioxide were added to the mixture. Heating and stirring were continued for an additional hour. The pressure was gradually lowered over 75 minutes to 1.0-1.4 mm. of mercury, while the temperature was simultaneously increased to 250° C. After about 3 hours and 15 minutes, the polycondensation was terminated. The resultant resin was extruded onto a moving belt and thence diced into small chips.

The resin was yellow in color, it had an intrinsic viscosity of 0.42; a free carboxyl content of 16 meq. per kg; contained 5.76 % bromine; and melted at 222° C. The resin was melt spun in the conventional manner to give a 34 filament yarn. The samples could not be drawn using a heated pin (93° C.), thus cold drawing was necessary. Occasional splits occurred during the drawing. The physical properties as shown in Table IV are averages obtained from several trials.

Table IV summarizes the physical properties obtained from the polyester yarns prepared in EXAMPLES II, III, and IV. The yarns were processed in each case to obtain the best physical properties.

Table IV

| Example | | Bromine (%) | Tenacity (g./d.) | Elongation (%) |
|---|---|---|---|---|
| PET[1] | Control | 0 | 3.4 | 39.2 |
| PEN[2] | Control | 0 | 5.1 | 34.8 |
| II | (PEN-DBT) | 4.58 | 4.0 | 34.6 |
| III | (PET-DBT) | 9.49 | 2.1 | 55.7 |
| IV | (PET-DBT) | 5.76 | 2.4 | 16.5 |

[1]PET = poly(ethylene terephthalate)
[2]PEN = poly(ethylene-2,6-naphthalene dicarboxylate)

The data in Table IV indicates that polyester fibers, obtained from the copolymerization of 2,5-dibromoterephthalate acid with naphthalene-2,6-dicarboxylic acid and ethylene glycol are unexpectedly superior in physical properties to those obtained from the corresponding copolymer of terephthalic acid and at the same time meet stringent flame-retardant standards. The results shown for the fibers of EXAMPLE III indicate that yarn blends containing yarns prepared from copolyesters of terephthalic acid and 2,5-dibromoterephthalic acid, although sufficient to impart flame-retardance are physically weaker and as a result will not give the outstanding wear performance typically associated with the nonflame-retardant blend.

EXAMPLE V

Dimethyl 2,5-dichloroterephthalate was prepared by adding 110 ml. of acetyl chloride to 2200 ml. of chilled absolute methanol. 258.5 g. (1.09 mol) of 2,5-dichlorophthalic acid was added to the above reaction mixture and the whole was refluxed overnight. It was then cooled to room temperature and the precipitate which had formed was filtered and dried, yielding 258.58 g. (90.2%) dimethyl 2,5-dichloroterephthalate, m.p. 134°-135° C. Recrystallization from absolute methanol raised the m.p. to 135°-136° C.

Dimethyl-2,6-naphthalene dicarboxylate, dimethyl-2,5-dichloroterephthalate (17.3 mol %) and ethylene glycol were polymerized to provide the corresponding random copolyester resin. The LOI of this copolyester was found to be 33.0. Analysis of this copolyester revealed that it contained 4.8% chlorine, 0.7% antimony (from antimony trioxide) and that it had an intrinsic viscosity of 0.56.

EXAMPLE VI

Dimethyl 2,2',6,6'-tetrachlorodiphenoxyethane-4,4'-dicarboxylate was prepared by first preparing methyl 4-hydroxy-3,5-dichlorobenzoate.

To 1200 ml. of chilled absolute methanol was added 60 g. of acetyl chloride over a period of 20 minutes. To the reaction mixture was added 250 g. (1.2 mol) 3,5-dichloro-4-hydroxybenzoic acid. The slurry was refluxed overnight. The clear solution was then cooled to room temperature and stripped to dryness upon the rotary evaporator under reduced pressure. The residue was slurried with 850 ml. of deionized water and 25 ml. concentrated aqueous sodium carbonate was added to a pH of 6.8. The slurry was stirred for 1/2 hour and then filtered. Drying of the solid yielded 259.1 g. (98.1%) of methyl 4-hydroxy-3,5-dichlorobenzoate, m.p. 121°-123° C.

To 1500 ml. absolute methanol was added 35.4 g. (1.54 mol) sodium metal. After all the sodium metal had reacted, 340.34 g. (1.54 mol) methyl 4-hydroxy-3,5-dichlorobenzoate was added. The hydroxyester went into solution but upon further stirring a solid precipitated. The slurry was charged, along with 140.7 g. (0.75 mol) freshly distilled 1,2-dibromoethane, into a stirred autoclave. The autoclave was pressurized to 200 pounds and the reaction mixture was heated at 160° C. for 3 hours. The autoclave was cooled and vented. The reaction mixture was heated to boiling and filtered hot. The precipitate was slurried and heated with 1 liter deionized water. The slurry was filtered hot. Drying of the precipitate in the vacuum oven yielded 165.15 g. (47.07%) dimethyl 2,2',6,6'-tetrachlorodiphenoxyethane-4,4'-dicarboxylate, m.p. 199°-201° C.

The copolyester obtained by reacting dimethyl-2,6-naphthalene dicarboxylate, ethylene glycol and 9.0 mol % of dimethyl-3,3',5,5'-tetrachloro-4,4'-(ethyleneoxy) dibenzoate was evaluated for flame-retardancy. It exhibited an LOI of 29.5. The resin contained 4.92% chlorine, 0.8% antimony (from $Sb_2O_3$), had an intrinsic viscosity of 0.68 and a melting point of 232° C.

Other copolyester resins of at least 75 mol % ethylene-2,6-naphthalene dicarboxylate units and either brominated or chlorinated ester units are prepared and tested in accordance with the procedures of the foregoing examples and are found to have unexpectedly high flame-retardant properties and, in the form of fibers and fabrics, have excellent physical properties. Brominated ester units are perferred halogenated units because of their ability to provide higher flame-retardancy at lower use levels.

Various changes and modifications may be made in practicing the invention without departing from the spirit and scope thereof and, therefore, the invention is not to be limited except as defined in the appended claims.

I claim:

1. Copolyester resin textile fibers comprising linear, filament-forming, random copolyester resin of at least 75 mol % of ethylene-2,6-naphthalene dicarboxylate units and at least 3 mol % up to 25 mol % of copolymerized halogenated ester unit is represented by the general formula

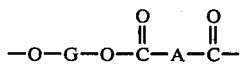

wherein G is the residue of an alkylene glycol having from 2 to 10 carbon atoms, A is the residue of a saturated dicarboxylic acid selected from one of 2,5-dibromo-or 2,5-dichloroterephthalic acid, said ester unit present in an amount sufficient to provide at least 3.5% of the halogen, based on the weight of the copolyester, blended with flame-retardant cellulosic textile fibers in an amount of from about 10 to 90% copolyester fibers and from about 90 to 10% cellulosic fibers.

2. The textile fiber blend of claim 1 wherein the cellulosic textile fibers are regenerated cellulose.

3. The textile fiber blend of claim 2 wherein the regenerated cellulose fibers contain a flame-retardant amount of a water-insoluble, liquid polymer of di-n-propyl phosphonitrilate.

4. The textile fiber blend of claim 1 wherein the cellulosic textile fibers are cellulose acetate fibers.

5. The textile fiber blend of claim 4 wherein the cellulose acetate fibers contain a flame-retardant amount of tris-(2,3-dibromopropyl) phosphate.

6. The textile fiber blend of claim 1 wherein the cellulosic textile fibers are cotton fibers.

* * * * *